United States Patent
Kim et al.

(10) Patent No.: US 7,999,840 B2
(45) Date of Patent: Aug. 16, 2011

(54) METHOD FOR PERFORMING VIDEO COMMUNICATION SERVICE AND MOBILE COMMUNICATION TERMINAL THEREFOR

(75) Inventors: Hwan Kim, Gumi-si (KR); Min-Hong Park, Busan (KR); Soo-Young Nam, Gumi-si (KR); Chae-Whan Lim, Daegu (KR); Jeong-Hoon Kim, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1464 days.

(21) Appl. No.: 11/451,501

(22) Filed: Jun. 13, 2006

(65) Prior Publication Data

US 2007/0115346 A1    May 24, 2007

(30) Foreign Application Priority Data

Oct. 7, 2005 (KR) .................. 10-2005-0094365

(51) Int. Cl.
*H04N 7/14* (2006.01)
(52) U.S. Cl. ..................... 348/14.02; 455/566
(58) Field of Classification Search ............... 348/14.02; 455/566
See application file for complete search history.

(56) References Cited

U.S. PATENT DOCUMENTS

| 6,212,547 B1 | 4/2001 | Ludwig et al. |
| 2004/0253991 A1* | 12/2004 | Azuma ..................... 455/566 |
| 2006/0023063 A1* | 2/2006 | Okawa ..................... 348/14.09 |

FOREIGN PATENT DOCUMENTS

| CN | 1610424 A | 4/2005 |
| GB | 2320657 A | 6/1998 |
| KR | 2005-38733 | 4/2005 |
| WO | WO03/071420 A2 | 8/2003 |

* cited by examiner

*Primary Examiner* — Stella L Woo
(74) *Attorney, Agent, or Firm* — Roylance, Abrams, Berdo and Goodman, LLP

(57) ABSTRACT

A method and terminal for performing a video communication service where the operation mode of the mobile communication terminal switches to a screen sharing mode upon receipt of a screen sharing request from a user during a video communication, screen data selected according to user selection information in the screen sharing mode is output to a display unit, the screen data displayed on the display unit is acquired, and the acquired screen data is transmitted instead of the user's video data to a corresponding terminal performing the video communication.

20 Claims, 3 Drawing Sheets

METHOD FOR PERFORMING VIDEO COMMUNICATION SERVICE AND MOBILE COMMUNICATION TERMINAL THEREFOR

PRIORITY

This application claims the benefit under 35 U.S.C. §119(a) of Korean patent application no. 2005-94365, filed Oct. 7, 2005, in the Korean Intellectual Property Office, the entire contents of which are hereby incorporated by reference.

BACKGROUND OF THE INVENTION

1. Field of the Invention

The present invention relates to a method for performing a video communication service and a mobile communication terminal. More particularly, the present invention relates to a method and terminal for performing a video communication service in which a calling terminal and a called terminal can share video data in real-time during a video communication.

2. Description of the Related Art

A mobile communication terminal having a video communication function transmits user video data, receives video data from a corresponding user, and displays the received video data during audio and video transmission/reception. A video communication method using the mobile communication terminal inserts control data into compressed audio and video data for transmission/reception through a traffic channel using a data service function in which the reliability of Quality of Service (QoS) may not be guaranteed due to delay or jitter caused by the nature of the channel. To implement real-time audio and video streaming by detecting data loss occurring during transmission/reception, a transmitting terminal uses a predetermined protocol.

Loss of audio and video data usually occurs during transmission through a wireless environment. To overcome such loss, control data for error checking is transmitted with the audio and video data using a protocol such as Real-time Transport Protocol (RTP), H.324M, H.323, or SIP. Among these protocols, H.324M is a video communication standard of the International Telecommunications Union-Telecommunication Standard Sector (ITU-T) and is used for transmission of compressed audio and video data from a transmitting terminal based on Wideband Code Division Multiple Access (WCDMA).

To share predetermined video data (for example, moving picture contents) between a calling terminal having the video communication function and a called terminal having the video communication function, the calling terminal streams video data to the called terminal in real-time and the called terminal reproduces the received video data in real-time. In this case, the calling terminal cannot transmit the video data while reproducing the video data. As a result, the user of the called terminal can immediately reproduce and check the received video data, but the user of the calling terminal cannot check the video data being transmitted. Consequently, the user of the calling terminal may transmit undesired video data.

Moreover, in conventional video communications, the calling terminal and the called terminal cannot share screen data displayed in real-time on the calling terminal except for each other's video data.

SUMMARY OF THE INVENTION

Accordingly, it is an object of exemplary embodiments of the present invention to provide a method and terminal for performing a video communication service in which screen data displayed on a calling terminal can be shared with a called terminal in real-time during a video communication.

It is another object of exemplary embodiments of the present invention to provide a method and terminal for performing a video communication service in which video data reproduced in a calling terminal can be shared with a called terminal in real-time during a video communication.

According to an aspect of exemplary embodiments of the present invention, there is provided a method and terminal for performing a video communication service where the operation mode of the mobile communication terminal switches to a screen sharing mode upon receipt of a screen sharing request from a user during video communication, screen data selected according to user selection information in the screen sharing mode is output to a display unit, the screen data displayed on the display unit is acquired, and the acquired screen data instead is transmitted of user's video data to a corresponding terminal performing the video communication.

According to another aspect of exemplary embodiments of the present invention, there is provided a method and terminal for performing a video communication service where the operation mode of the mobile communication terminal switches to a video sharing mode upon receipt of a video sharing request from a user during a video communication, an option for video data selected by the user in the video sharing mode is set, the video data for which the option is set is output through an output unit of the mobile communication terminal, and the output video data is transmitted instead of user's video data to be transmitted to a corresponding terminal.

Exemplary implementations of the present invention further comprise displaying video data stored in the mobile communication terminal on an item-by-item basis when switching the operation mode of the mobile communication terminal to the video sharing mode.

Another exemplary implementation of the present invention further comprise retransmitting the selected video data upon receipt of a request for retransmission of the selected and transmitted video data from the corresponding terminal.

BRIEF DESCRIPTION OF THE DRAWINGS

The above and other objects, exemplary features and advantages of the present invention will become more apparent from the following detailed description of certain exemplary embodiments when taken in conjunction with the accompanying drawings, in which.

Throughout the drawings, like reference numbers should be understood to refer to like elements, features, and structures.

DETAILED DESCRIPTION OF EXEMPLARY EMBODIMENTS

The matters exemplified in this description are provided to assist in a comprehensive understanding of various exemplary embodiments of the present invention disclosed with reference to the accompanying figures. Accordingly, those of ordinary skill in the art will recognize that various changes and modifications of the exemplary embodiments described herein can be made without departing from the scope and spirit of the claimed invention. Descriptions of well-known functions and constructions are omitted for clarity and conciseness.

Figure 1:
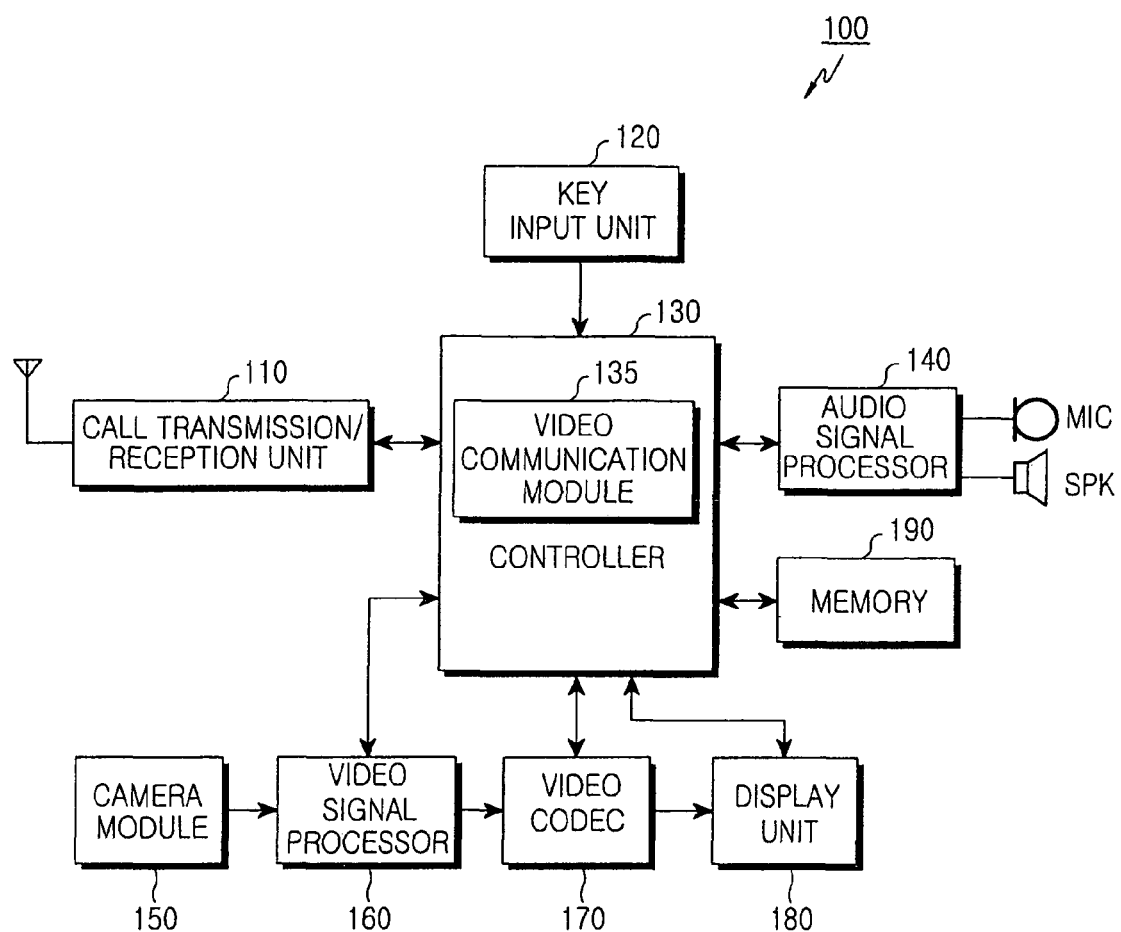
FIG. 1 is a block diagram of a mobile communication terminal according to an exemplary embodiment of the present invention.

FIG. 1 is a block diagram of a mobile communication terminal 100 according to an exemplary embodiment of the present invention. It is assumed that the mobile communication terminal 100 uses Wideband Code Division Multiple Access (WCDMA) allowing a video communication and comprises at least one encoder and decoder.

The mobile communication terminal 100 comprises a call transmission/reception unit 110, a key input unit 120, a controller 130, a video communication module 135, an audio signal processor 140, a camera module 150, a video signal processor 160, a video codec 170, a display unit 180, and a memory 190.

The call transmission/reception unit 110 transmits a video communication signal received through an antenna to the controller 130 and transmits a video communication signal to a base station (not shown) through the antenna under the control of the controller 130. The video communication signal transmitted to the base station is transmitted to a corresponding terminal performing video communication with the mobile communication terminal 100.

The key input unit 120 has a key matrix structure (not shown) and comprises character keys, number keys, and various functions keys to output a key input signal corresponding to a key input by a user to the controller 130.

The controller 130 controls overall operations of the mobile communication terminal 100 according to an exemplary embodiment of the present invention and may comprise the video communication module 135 for performing video communication.

The controller 130 switches the operation mode of the mobile communication terminal 100 to a screen sharing mode upon receipt of a screen sharing request from the user during a video communication. The controller 130 performs controlling such that video communication continues even after switching to the screen sharing mode. The user may request switching to the screen sharing mode by executing a specific key on the key input unit 120 or a separately provided key, or using a menu key.

If the operation mode of the mobile communication terminal 100 is switched to the screen sharing mode, the controller 130 outputs a standby mode screen or a separate application as a background screen to the display unit 180. At this time, the controller 130 does not output transmitted/received video data to the display unit 180 and stop transmitting the video data to the corresponding terminal (that is, a called terminal) during activation of sharing.

Upon selection of screen data according to user selection information when the standby mode screen or the separate application is output as the background screen, the controller 130 outputs the selected screen data to the display unit 180. The screen data that can be selected by the user may be all display data output to the display unit 180 and the display data may comprise a still image, a moving image, a document, a game, a message, and the standby mode screen. The document may comprise a telephone directory screen.

The controller 130 acquires the screen data output to the display unit 180 in the screen sharing mode and transmits the acquired screen data to the corresponding terminal. The acquisition and transmission of the screen data are performed as follows.

The controller 130 acquires a screen image output from the display unit 180 on a sheet-by-sheet basis using a function for periodically acquiring a screen image in a User Interface (UI) module (not shown) and transmits the acquired screen image using an image transmission method of a video telephone.

An example of a program for the acquisition and transmission is as follows:

```
SetTimer(time interval, CallbackFunction);
CallbackFunction( )
{
GetScreenImage( ); // acquire screen image as bitmap
SendImage( ); // send acquired bitmap data through VT
SetTimer(time interval, CallbackFunction);
}
```

The controller 130 may periodically copy screen data acquired from a Liquid Crystal Display (LCD) buffer (not shown) to the memory 190 that stores camera data to be transmitted to the video codec 170, thereby transmitting the acquired screen data instead of the camera data, that is, the user's video data.

The controller 130 may perform two operations for transmitting the screen data acquired in the screen sharing mode to a corresponding terminal.

First, the controller 130 activates screen sharing at the beginning of the screen sharing mode and transmits screen data instead of the user's video data to the corresponding terminal.

Second, the controller 130 requests the user's confirmation for activating screen sharing in the form of a voice or character message after switching the operation mode to the screen sharing mode. Upon receipt of the user's confirmation, the controller 130 activates screen sharing and transmits the screen data. If there is no user confirmation, the controller 130 transmits the user's video data, that is, the camera data, to the corresponding terminal.

The controller 130 may also perform the following operations to allow video data reproduced in the calling terminal to be shared with the called terminal in real-time during a video communication.

In other words, the controller 130 switches the operation mode of the mobile communication terminal 100 to a video sharing mode upon receipt of a video sharing request from the user during the video communication and transmits video data selected by the user in the video sharing mode to the corresponding terminal. The video data can, for example, comprise one of a moving picture, a slide image, and a flash image stored in the memory 190. The controller 130 may retransmit the video data upon receipt of a request for retransmission of the video data from the corresponding terminal.

In an exemplary implementation, the controller 130 displays video data stored in the memory 190 on the display unit 180 on an item-by-item basis upon receipt of the video sharing request from the user and displays the video data in the form of a predetermined screen size on the display unit 180 using a preview function to allow the user to easily recognize the video data for each item.

The controller 130 may also set an audio output option for the selected video data at the user's request. The audio output option comprises a mute function, a background music function, and a volume adjustment function for the video data. Thus, if the corresponding terminal performing the video communication with the mobile communication terminal 100 receives the video data for which the audio output option is set, the controller 130 outputs the video data according to the set audio output option. For example, when the corresponding terminal receives and outputs the video data for which the mute function is set, the mute video data is output.

The video communication module 135 demodulates and decodes the video communication signal received by the call transmission/reception unit 110 to separate the video communication signal into an audio source and a video source. The video communication module 135 outputs the audio source and the video source to the audio signal processor 140 and the video codec 170, respectively.

The video communication module 135 also modulates the video source encoded by the video codec 170 and the audio source encoded by the audio signal processor 140 for transmission to the call transmission/reception unit 110.

The audio signal processor 140 decodes the audio source output from the controller 130 into an audio signal, converts the audio signal into an analog signal, outputs the analog signal through a speaker. The audio signal processor 140 also converts an audio signal input through a microphone into a digital signal and encodes the digital signal into an audio source.

The audio signal processor 140 can comprise a codec. Here, the codec comprises a data codec for processing packet data and an audio codec for processing audio signals such as voice. The data codec and the audio codec may be included in the controller 130.

The camera module 150 converts an optical signal of an object photographed through lenses (not shown) into an electric video signal and outputs the electric video signal to the video signal processor 160.

The video signal processor 160 converts the electric video signal input from the camera 150 into a digital video signal and outputs the digital video signal to the video codec 170.

The video codec 170 compresses the video signal input from the video signal processor 160, encodes the video signal into a video source, and outputs the video source to the controller 130. The video codec 170 can, for example, be implemented with a JPEG codec, an MPEG-4 codec, or a Wavelet codec.

The display unit 180 can, for example, be implemented with an LCD and output various display data of the mobile communication terminal 100. When the LCD is implemented with a touch screen, the display unit 180 can also serve as an input unit.

The memory 190 can comprise program memory and data memory and store information for controlling operations of the mobile communication terminal 100 and information selected according to the user selection information. In other words, the memory 190 can comprise Read-Only Memory (ROM) that stores an operating algorithm accessed by the controller 130 for overall operation of the mobile communication terminal 100 and a Random Access Memory (RAM) that stores data according to a control command during data processing of the controller 130.

The memory 190 can also store screen data or video data to be shared with a corresponding terminal under the control of the controller 130. The screen data can, for example, comprise a still image, a moving image, a document, a game, or a message, and the video data can, for example, comprise a moving image, a slide image, or a flash image.

Figure 2:
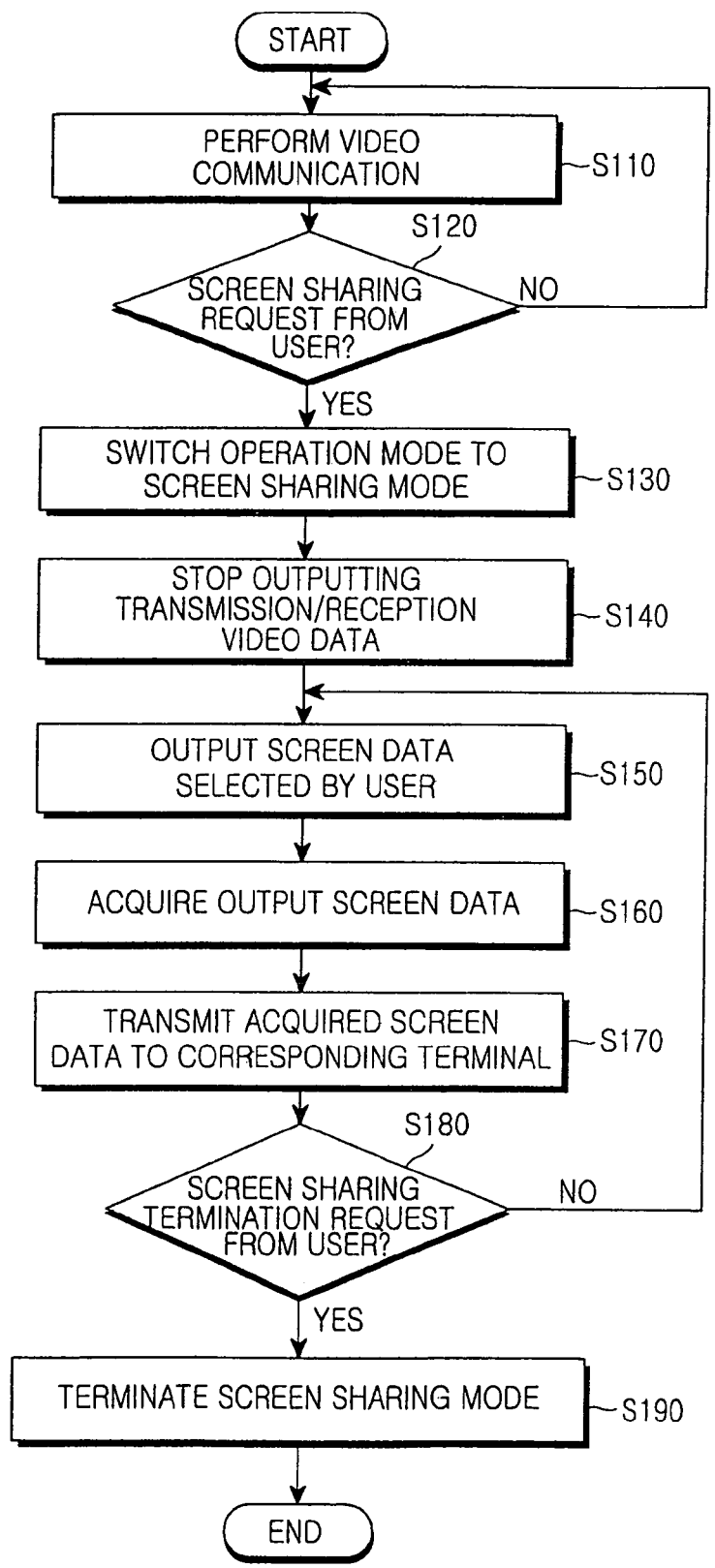
FIG. 2 is a flowchart illustrating a method for performing a video communication service in a mobile communication terminal according to an exemplary embodiment of the present invention.

FIG. 2 is a flowchart illustrating a method for performing a video communication service in the mobile communication terminal 100 according to an exemplary embodiment of the present invention.

Referring to FIGS. 1 and 2, the controller 130 performs a video communication with a corresponding terminal in a video communication mode upon receipt of a video communication request from the user in step S110.

The controller 130 checks if the screen sharing request is received from the user during the video communication in step S120. The user may request the screen sharing mode by executing a specific key on the key input unit 120 or a separately provided key, or using a menu key.

Upon receipt of the screen sharing request from the user, the controller 130 switches the operation mode of the mobile communication terminal 100 to the screen sharing mode in step S130. At this time, it is preferable that the controller 130 perform controlling such that the video communication continues even after the operation mode of the mobile communication terminal 100 is switched to the screen sharing mode.

If the operation mode of the mobile communication terminal 100 is switched to the screen sharing mode, the controller 130 terminates the transmission/reception of video data in step S140. In other words, the controller 130 stops outputting video data to be output to the display unit 180 in the screen sharing mode.

After the controller 130 switches the operation mode of the mobile communication terminal 100 to the screen sharing mode in step S130, it may further request user confirmation for activating screen sharing. In an exemplary implementation, the controller 130 request user confirmation in the form of a voice or character message. Upon receipt of user confirmation responding to the request, the controller 130 terminates the transmission/reception of video data. At this time, the controller 130 may also stop the transmission of the video data to the corresponding terminal together with the output of the video data.

The controller 130 outputs screen data selected according to user selection information in the screen sharing mode to the display unit 180 in step S150. The screen data can comprise all display data output to the display unit 180, and the display data can comprise, for example, a still image, a moving image, a document, a game, and a message. In an exemplary implementation, the transmitter 130 stop transmitting video data to the corresponding terminal upon the output of screen data to the display unit 180.

The controller 130 acquires the screen data output to the display unit 180 in step S160. The acquisition of the screen data has already been described with reference to FIG. 1 and a description thereof will not be provided here.

The controller 130 transmits the acquired screen data to the corresponding terminal through the call transmission/reception unit 110 in step S170.

The controller 130 checks if a screen sharing termination request is received from the user in step S180. The user may request termination of the screen sharing mode by executing a specific key on the key input unit 120 or a separately provided key, or using a menu key.

If the screen sharing termination request is not received, the controller 130 returns to step S150. The controller 130 terminates the screen sharing mode of the mobile communication terminal 100 in step S190. The controller 130 then stops transmitting the screen data and resumes transmission of camera data, that is, user video data to the corresponding terminal.

In this way, during a video communication, data output on the screen of the calling terminal, such as, a still image, a moving image, a document, a game, or a message, can be shared with a corresponding terminal. The corresponding terminal may also store and use such data provided by the calling terminal.

Figure 3:
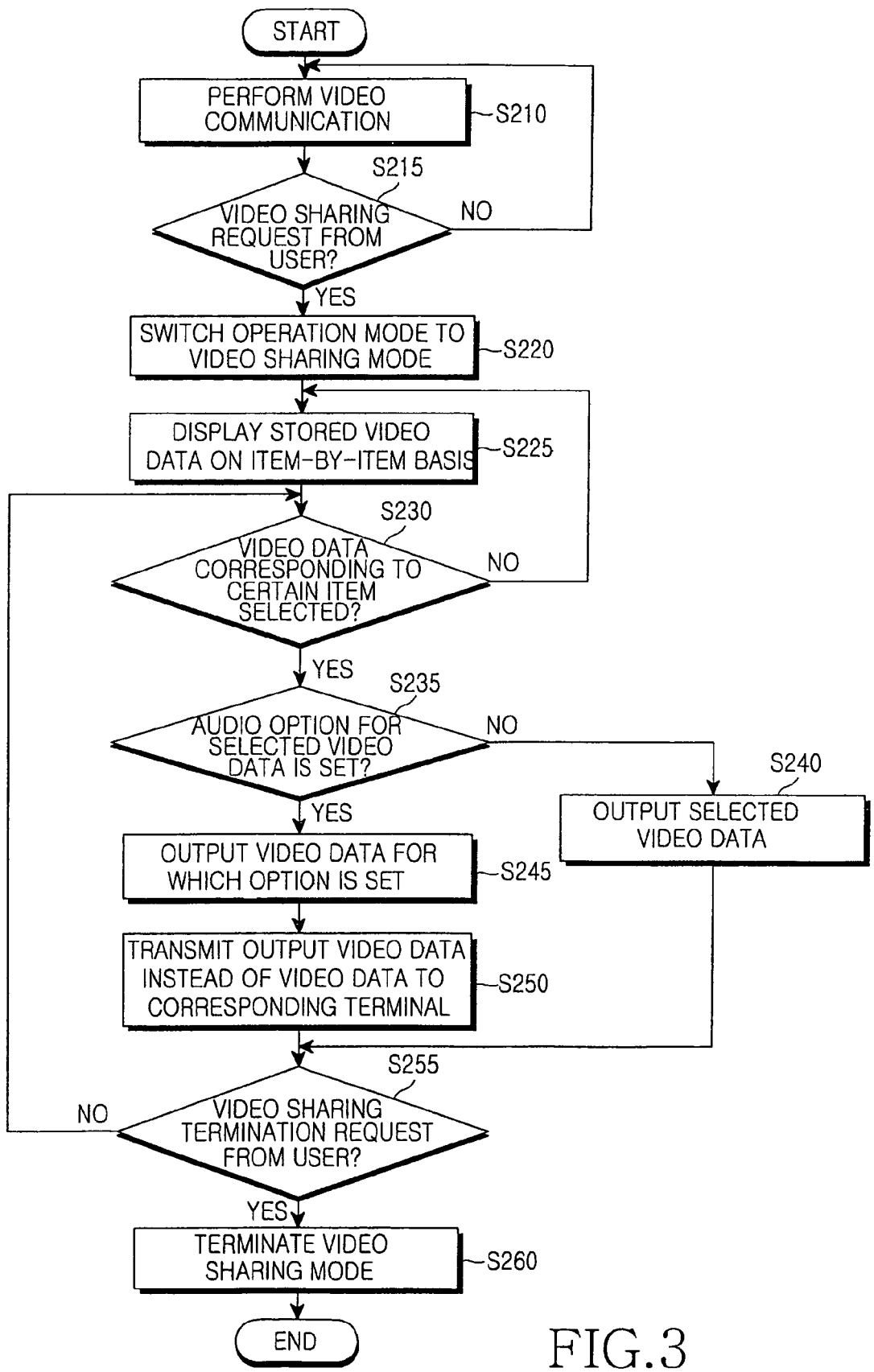
FIG. 3 is a flowchart illustrating a method for performing a video communication service in a mobile communication terminal according to an exemplary embodiment of the present invention.

FIG. 3 is a flowchart illustrating a method for performing a video communication service in the mobile communication terminal 100 according to another exemplary embodiment of the present invention.

Referring to FIGS. 1 and 3, the controller 130 performs a video communication with a corresponding terminal in a video communication mode upon receipt of a video communication request from the user in step S210.

The controller 130 checks if a video sharing request is received from the user during the video communication in step S215. The user may request video sharing by executing a specific key on the key input unit 120 or a separately provided key, or using a menu key. The video data to be shared can, for example, comprise one of a moving image, a slide image, and a flash image.

The controller 130 switches the operation mode of the mobile communication terminal 100 to the video sharing mode in step S220 upon receipt of a video sharing request from the user. At this time, in an exemplary implementation, the controller 130 performs controlling such that the video communication continues even after the operation mode of the mobile communication terminal 100 is switched to the video sharing mode.

If the operation mode of mobile communication terminal 100 is switched to the video sharing mode, the controller 130 displays video data stored in the memory 190 on the display unit 180 on an item-by-item basis in step S225. Here, the item can refer to an item such as a moving image, a slide image, and a flash image, or each item of the moving image. The controller 130 can display the video data in the form of a certain screen size on the display unit 180 using a preview function to allow the user to easily recognize the video data for each item.

The controller 130 checks if video data corresponding to a certain item is selected among the video data displayed on an item-by-item basis in step S230.

If the video data corresponding to the certain item is selected, the controller 130 checks if an audio output option is set for the selected video data in step S235. The audio output option comprises a mute function, a background music function, and a volume adjustment function for video data. In other words, the audio output option comprises an audio mute function for muting a sound of the video data, an audio background music function for reproducing a sound at a low volume to prevent interruption of a communication, and an audio level adjustment function for adjusting the volume of a sound by the user.

If the audio output option is not set for the selected video data, the controller 130 directly outputs the selected video data through an output unit in step S240. The output unit comprises a speaker and display unit 180.

If the audio output option is set for the selected video data, the controller 130 outputs the selected video data for which the audio output option is set in step S245.

When the selected video data is output, in an exemplary implementation, the controller 130 stops transmitting user video data to the corresponding terminal and outputs transmission/reception video data to the display unit 180. The controller 130 may stop transmitting user video data when the operation mode of the mobile communication terminal 100 is switched to the video sharing mode.

The controller 130 may output the screen of the selected video data to the display unit 180 as a full screen, or simultaneously output the screen of the selected video data and the screen of a user image photographed by a camera. The controller 130 may also simultaneously output the screen of the selected video data and the screen of a corresponding screen transmitted from a corresponding terminal.

The controller 130 transmits the output video data, instead of user video data, to the corresponding terminal through the call transmission/reception unit 110 in step S250.

The controller 130 checks if a video sharing termination request is received from the user in step S255. The user may request termination of the video sharing mode by executing a specific key on the key input unit 120 or a separately provided key, or using a menu key.

If the video sharing termination request is not received, the controller 130 returns to step S230. Upon receipt of the video sharing termination request from the user, the controller 130 terminates the video sharing mode of the mobile communication terminal in step S260. The controller 130 then stops transmitting the video data and resumes transmission of the camera data, that is, user video data to the corresponding terminal.

The controller 130 may retransmit the video data upon receipt of a request for retransmission of the video data from the corresponding terminal.

As described above, according to exemplary embodiments of the present invention, during a video communication, data output on a screen of a calling mobile communication terminal, such as, for example, a still image, a moving image, a document, a game, or a message, can be shared with a user of a called terminal in real-time. Furthermore, the user of the called terminal can store and use data provided by the calling terminal.

While the present invention has been particularly shown and described with reference to certain exemplary embodiments thereof, it will be understood by those of ordinary skill in the art that various changes in form and detail may be made therein without departing from the spirit and scope of the invention as defined by the appended claims and equivalents thereof.

What is claimed is:

1. A method for performing a video communication service in a mobile communication terminal, the method comprising:
   switching operation mode of a mobile communication terminal to a screen sharing mode upon receipt of a screen sharing request during video communication;
   outputting screen data selected according to selection information in the screen sharing mode to a display unit;
   acquiring the screen data displayed on the display unit; and
   transmitting the acquired screen data to a corresponding terminal,
   wherein the video communication continues after the operation mode of the mobile communication terminal is switched to a screen sharing mode.

2. The method of claim 1, wherein the selected screen data comprises display data output to the display unit of the mobile communication terminal.

3. The method of claim 2, wherein the display data comprises at least one of a still image, a moving image, a document, a game, and a message.

4. The method of claim 1, wherein outputting the selected screen data comprises:
   terminating at least one of transmission and reception of video data if the operation mode of the mobile communication terminal is switched to the screen sharing mode; and
   outputting the screen data selected according to the selection information to the display unit.

5. The method of claim 4, further comprising terminating transmission of the selected screen data to the corresponding terminal if the screen data is output to the display unit.

6. The method of claim 4, wherein outputting the selected screen data comprises:
   requesting confirmation for activating screen sharing after the switching to the screen sharing mode; and
   terminating at least one of the transmission and reception of video data upon input of the confirmation.

7. The method of claim 1, wherein the acquired screen data is transmitted to a corresponding terminal instead of the selected screen data.

8. A method for performing a video communication service in a mobile communication terminal, the method comprising:
   switching operation mode of a mobile communication terminal to a video sharing mode upon receipt of a video sharing request during video communication;
   setting an option for video data selected in the video sharing mode;
   outputting the video data for which the option is set through an output unit of the mobile communication terminal; and
   transmitting the output video data to a corresponding terminal,
   wherein the video communication continues after the operation mode of the mobile communication terminal is switched to a video sharing mode.

9. The method of claim 8, wherein the video data comprises at least one of a moving image, a slide image, and a flash image.

10. The method of claim 8, further comprising displaying video data stored in the mobile communication terminal on an item-by-item basis when switching the operation mode of the mobile communication terminal to the video sharing mode.

11. The method of claim 8, wherein the setting of the option comprises setting an audio output option for the selected video data.

12. The method of claim 11, wherein the audio output option comprises at least one of a mute function, a background music function, and a volume adjustment function for the selected video data.

13. The method of claim 8, further comprising retransmitting the selected video data upon receipt of a request for retransmission of the selected and transmitted video data from the corresponding terminal.

14. The method of claim 8, wherein the output video data is transmitted to a corresponding terminal instead of the selected video data.

15. A mobile communication terminal comprising:
   a transmission/reception unit;
   a display unit; and
   a controller,
   wherein:
   the controller is configured to switch operation mode of the mobile communication terminal to a screen sharing mode upon receipt of a screen sharing request during video communication;
   the display unit is configured to receive screen data selected according to selection information in the screen sharing mode;
   the controller is further configured to acquire the screen data displayed on the display unit; and
   the transmission/reception unit is configured to transmit the acquired screen data to a corresponding terminal,
   wherein the video communication continues after the operation mode of the mobile communication terminal is switched to a screen sharing mode.

16. The terminal of claim 15, wherein the selected screen data comprises display data output to the display unit of the mobile communication terminal.

17. The terminal of claim 15, wherein the selected screen data comprises display data output to the display unit of the mobile communication terminal.

18. The terminal of claim 15, wherein the controller is further configured to terminate at least one of transmission and reception of video data if the operation mode of the mobile communication terminal is switched to the screen sharing mode.

19. The terminal of claim 18, wherein the controller is further configured to terminate transmission of the selected screen data to the corresponding terminal if the screen data is output to the display unit.

20. The terminal of claim 18, wherein the controller is further configured to request confirmation for activating screen sharing after switching to the screen sharing mode and terminate at least one of the transmission and reception of video data upon input of the confirmation.

* * * * *